(12) United States Patent
Ikeda et al.

(10) Patent No.: US 8,506,273 B2
(45) Date of Patent: Aug. 13, 2013

(54) SEAMLESS CAPSULE MANUFACTURING APPARATUS

(75) Inventors: Masayuki Ikeda, Shinjuku-ku (JP); Hiroshi Nagao, Shinjuku-ku (JP)

(73) Assignee: Freund Corporation, Tokyo (JP)

( * ) Notice: Subject to any disclaimer, the term of this patent is extended or adjusted under 35 U.S.C. 154(b) by 205 days.

(21) Appl. No.: 13/124,210

(22) PCT Filed: Oct. 9, 2009

(86) PCT No.: PCT/JP2009/067614
§ 371 (c)(1),
(2), (4) Date: Apr. 18, 2011

(87) PCT Pub. No.: WO2010/047236
PCT Pub. Date: Apr. 29, 2010

(65) Prior Publication Data
US 2011/0212203 A1 Sep. 1, 2011

(30) Foreign Application Priority Data
Oct. 20, 2008 (JP) ................................. 2008-269900

(51) Int. Cl.
*B01J 13/20* (2006.01)
*B01J 2/06* (2006.01)

(52) U.S. Cl.
USPC ................... 425/5; 425/10; 425/70; 425/185; 425/804

(58) Field of Classification Search
USPC ................. 425/5, 10, 6, 67, 68, 70, 185, 804; 264/4, 4.3, 13, 14
See application file for complete search history.

(56) References Cited

U.S. PATENT DOCUMENTS

| 2,471,358 | A | * | 5/1949 | Stephenson | 264/4 |
| 2,911,672 | A | * | 11/1959 | Van Erven Dorens et al. | 264/4 |
| 4,251,195 | A | * | 2/1981 | Suzuki et al. | 425/6 |
| 4,422,985 | A | * | 12/1983 | Morishita et al. | 264/4.4 |

(Continued)

FOREIGN PATENT DOCUMENTS

| JP | 6-124293 | 5/1994 |
| JP | 6-218314 | 8/1994 |

(Continued)

OTHER PUBLICATIONS

International Search Report issued Dec. 28, 2009 in International (PCT) Application No. PCT/JP2009/067614.

(Continued)

*Primary Examiner* — Seyed Masoud Malekzadeh
(74) *Attorney, Agent, or Firm* — Wenderoth, Lind & Ponack, L.L.P.

(57) ABSTRACT

A liquid coolant supply pipe and an over flow pipe are provided on the outer side of a capsule forming pipe through which a liquid coolant flows and into which liquid droplets are dropped from a nozzle. The liquid coolant is supplied to the liquid coolant supply pipe by a low pulsatory motion type pump, and the flow is regulated by a flow straightening block in the liquid coolant supply pipe. The cooling liquid passes through a liquid coolant introducing section having a curved surface, and then flows into the capsule forming pipe from an upper portion opening in a cap mounted to the upper part of the capsule forming pipe. The liquid coolant flows into the capsule forming pipe, and the excess flows into the overflow pipe.

5 Claims, 3 Drawing Sheets

(56) References Cited

U.S. PATENT DOCUMENTS

| | | | |
|---|---|---|---|
| 4,426,337 A * | 1/1984 | Suzuki et al. | 264/4 |
| 5,209,978 A * | 5/1993 | Kosaka et al. | 428/402.2 |
| 5,358,569 A | 10/1994 | Conroy et al. | |
| 5,882,680 A | 3/1999 | Suzuki et al. | |
| 5,888,538 A * | 3/1999 | Kiefer et al. | 424/451 |
| 6,174,466 B1 * | 1/2001 | Kiefer et al. | 264/4.4 |
| 6,318,123 B1 * | 11/2001 | Edlinger | 65/19 |
| 6,361,298 B1 * | 3/2002 | Kiefer et al. | 425/5 |
| 6,719,933 B2 * | 4/2004 | Nakamura et al. | 264/14 |
| 7,112,292 B2 | 9/2006 | Nakajima et al. | |

FOREIGN PATENT DOCUMENTS

| | | |
|---|---|---|
| JP | 9-155183 | 6/1997 |
| JP | 2000-189495 | 7/2000 |
| JP | 2002-136576 | 5/2002 |
| JP | 2003-190258 | 7/2003 |
| JP | 2004-209334 | 7/2004 |

OTHER PUBLICATIONS

International Preliminary Report on Patentability issued May 26, 2011 in International (PCT) Application No. PCT/JP2009/067614, together with English translation thereof.

* cited by examiner

SEAMLESS CAPSULE MANUFACTURING APPARATUS

TECHNICAL FIELD

The present invention relates to a technique for manufacturing a seamless capsule in which a filling substance, such as food, health food, medicine, aroma chemicals or spices, is covered with a coating containing gelatin, agar or the like.

BACKGROUND ART

Many seamless capsules used for medicine or the like have been manufactured by a production method called a dripping method. According to the dripping method, a multiple nozzle is typically used. For a two-layer capsule, what is used is a double nozzle; a discharge opening for a capsule filling substance is placed inside the double nozzle, while a discharge opening for a coating substance is placed outside the double nozzle. The filling substance and the coating substance are released from the tip of each nozzle into a hardening liquid. The released droplet takes a spherical shape because of the surface tension thereof. The droplet is cooled down and solidified in the hardening liquid that circulates at a constant speed. As a result, a spherical seamless capsule is formed.

As for such a seamless capsule manufacturing apparatus, those disclosed in Patent Documents 1 to 3 have been known, for example. For example, what is disclosed in Patent Document 1 is a seamless capsule manufacturing apparatus that uses a multiple nozzle equipped with a vibration exciter. According to the device disclosed in Patent Document 1, the multiple nozzle releases a liquid current for forming a capsule into a hardening liquid. In the hardening liquid, the liquid current is vibrated and divided. Therefore, a multilayer seamless capsule is formed. FIG. 3 is an explanatory diagram showing the configuration of such a conventional seamless capsule manufacturing apparatus.

In the device shown in FIG. 3, a vibration exciter 52 is placed on an upper portion of a multiple nozzle 51. The vibration exciter 52 adds vibrations to the nozzle 51. A core liquid 53 and an outer coating liquid 54 are supplied into the nozzle 51. The core liquid 53 and the outer coating liquid 54 make up a multilayer liquid current 55, which is released into a hardening liquid coolant 56 from a tip portion of the nozzle 51. The liquid coolant 56 is supplied to a liquid coolant inflow section 59 having a double-pipe structure; a capsule forming pipe 57 is placed inside the liquid coolant inflow section 59, and a solution supply pipe 58 outside the liquid coolant inflow section 59. The liquid current 55 released from the nozzle 51 drops into the capsule forming pipe 57. In the capsule forming pipe 57, the liquid current 55 is divided into small multilayer droplets 61 as vibrations are added by the vibration exciter 52. The multilayer droplets 61 move on in the liquid coolant 56 as the liquid coolant 56 flows. At this time, the outer layers of the multilayer droplets 61 become solid in the liquid coolant 56. As a result, multilayer seamless capsules are formed.

Patent Document 1: Jpn. Pat. Appln. Laid-Open Publication No. 9-155183
Patent Document 2: Jpn. Pat. Appln. Laid-Open Publication No. 2000-189495
Patent Document 3: Jpn. Pat. Appln. Laid-Open Publication No. 6-124293

However, according to such a conventional seamless capsule manufacturing apparatus, if the flow volume of the liquid coolant 56 becomes unstable or if the flow of the liquid coolant 56 flowing into the capsule forming pipe 57 becomes unbalanced, there is a fear that the shape of the multilayer droplets 61 might be changed in the capsule forming pipe 57. If the multilayer droplets 61 has deformed, a neatly-formed spherical seamless capsule is not formed. Therefore, the problem is that it is not possible to manufacture spherical capsules in a stable manner.

The object of the present invention is to have the stable flow of the liquid coolant in the capsule forming pipe and manufacture spherical seamless capsules in a stable manner.

SUMMARY OF THE INVENTION

A capsule manufacturing apparatus of the present invention is a capsule manufacturing apparatus that releases a droplet from a nozzle into a capsule forming pipe through which a hardening liquid flows and makes a surface portion of the droplet solidify in the hardening liquid to produce a seamless capsule. A cylindrical hardening liquid supply pipe may be provided so as to surround the outside of the capsule forming pipe, with an upper end of the hardening liquid supply pipe set higher than an upper end of the capsule forming pipe, so that the hardening liquid supplied from a bottom portion of the hardening liquid supply pipe flows into the capsule forming pipe that opens at a central portion of the hardening liquid supply pipe. Moreover, a cylindrical overflow pipe may be provided so as to surround the outside of the hardening liquid supply pipe, with an upper end of the overflow pipe set higher than an upper end of the hardening liquid supply pipe, so that the hardening liquid in the hardening liquid supply pipe spills over the upper end of the hardening liquid supply pipe into the overflow pipe.

According to the present invention, a hardening liquid inflow section, in which the hardening liquid flows into the capsule forming pipe and a droplet is released from the nozzle, takes a triple-pipe structure in which the hardening liquid supply pipe and the overflow pipe are placed outside the capsule forming pipe. The hardening liquid flows into the capsule forming pipe, and the excess thereof spills over the entire circumference of the hardening liquid supply pipe into the overflow pipe. Therefore, without accurate control of the amount of the hardening liquid being supplied, the position of a liquid surface at the hardening liquid inflow section becomes stable, and the liquid surface does not ripple and remains smooth.

In the capsule manufacturing apparatus, a hardening liquid introducing section that is in the shape of a curved surface may be provided at an inner surface side of an upper end portion of the capsule forming pipe. Therefore, the hardening liquid flows smoothly into the capsule forming pipe. Moreover, a removable cap member may be mounted on the upper end portion of the capsule forming pipe, with the hardening liquid introducing section provided at an inner surface side of an upper end portion of the cap member.

Moreover, in the hardening liquid supply pipe, a flow straightening block may be provided: the flow straightening block includes a large number of flow straightening holes, which extend in an axial direction and through which the hardening liquid that goes up from a bottom portion of the hardening liquid supply pipe passes. Therefore, it is possible to align the flow of the hardening liquid with the axial direction and absorb pulsatory motion of the hardening liquid.

Furthermore, the hardening liquid may be supplied into the hardening liquid supply pipe by a pump of a low pulsatory motion type. Therefore, the hardening liquid is supplied to the hardening liquid supply pipe in such a way that the liquid flows in a stable manner with less pulsatory motion.

ADVANTAGES OF THE INVENTION

According to the capsule manufacturing apparatus of the present invention, the hardening liquid inflow section, in which the hardening liquid flows into the capsule forming pipe, takes a triple-pipe structure in which the hardening liquid supply pipe and the overflow pipe are placed outside the capsule forming pipe. Therefore, the hardening liquid flows into the capsule forming pipe, and the excess thereof spills over the entire circumference of the hardening liquid supply pipe into the overflow pipe. Thus, without accurate control of the amount of the hardening liquid being supplied, the position of a liquid surface at the hardening liquid inflow section becomes stable. Accordingly, the liquid surface at the hardening liquid inflow section does not ripple and remains smooth, ensuring that a nozzle tip portion reaches the liquid surface. Moreover, disturbances in the flow of the hardening liquid are curbed. Therefore, it is possible to prevent the deformation of the capsules, enabling seamless capsules to be manufactured in a stable manner. Thus, it is possible to increase the yield of products and reduce costs of production.

EXPLANATION OF REFERENCE SYMBOLS

Figure 1:
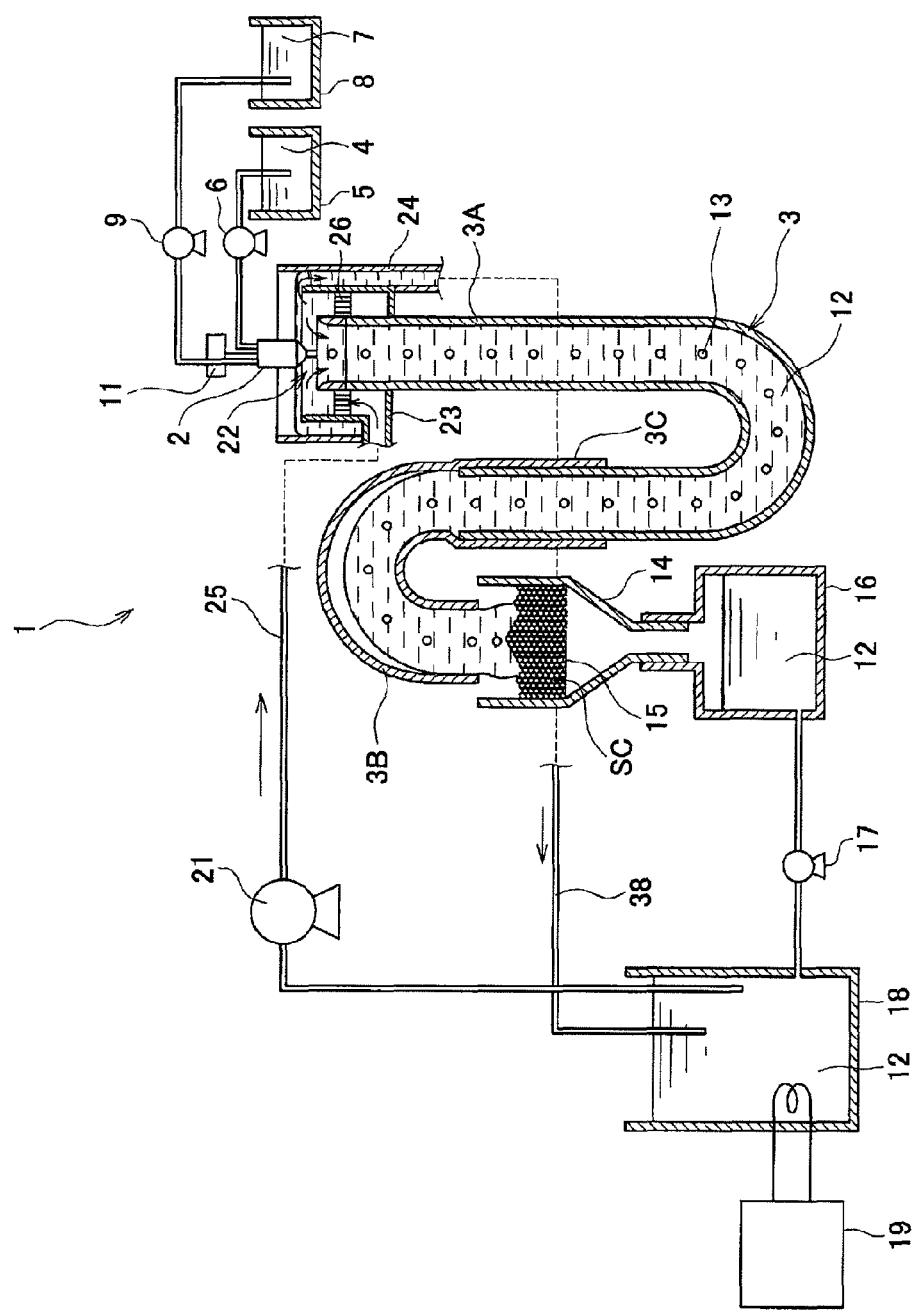
FIG. 1 is an explanatory diagram showing the overall configuration of a seamless capsule manufacturing apparatus according to an embodiment of the present invention.

1: Seamless capsule manufacturing apparatus
2: Multiple nozzle
3: Capsule forming pipe
3A: Upstream portion
3B: Downstream portion
3C: Fitting portion
4: Core liquid
5: Core liquid tank
6: Pump
7: Coating liquid
8: Coating liquid tank
9: Pump
11: Vibration exciter
12: Liquid coolant (Hardening liquid)
13: Multilayer droplet
14: Separator
15: Mesh
16: Separation tank
17: Pump
18: Cooling tank
19: Cooler
21: Pump
22: Liquid coolant inflow section (Hardening liquid inflow section)
23: Liquid coolant supply pipe (Hardening liquid supply pipe)
24: Overflow pipe
25: Pipe path
26: Flow straightening block
27: Flow straightening hole
28: Capsule forming pipe's upper end
29: Cap
31: Liquid coolant introducing section (Hardening liquid introducing section)
32: Cap's inner surface
33: Capsule forming pipe's inner surface
34: Upper portion opening
35: Nozzle's tip portion
36: Liquid coolant supply pipe's upper end
37: Overflow pipe's upper end
38: Return pipe
39: Liquid surface
51: Multiple nozzle
52: Vibration exciter
53: Core liquid
54: Outer coating liquid
55: Multilayer liquid current
56: Liquid coolant
57: Capsule forming pipe
58: Solution supply pipe
59: Liquid coolant inflow section
61: Multilayer droplet
SC: Seamless capsule

DETAILED DESCRIPTION OF THE INVENTION

Hereinafter, an embodiment of the present invention will be described in detail based on the accompanying drawings. FIG. 1 is an explanatory diagram showing the overall configuration of a seamless capsule manufacturing apparatus according to an embodiment of the present invention. As in the case of the device disclosed in Patent Document 1, the seamless capsule manufacturing apparatus 1 of the present invention is a device of a submerged nozzle type that is equipped with a multiple-structure nozzle. The multiple nozzle 2 (abbreviated as nozzle 2, hereinafter) releases droplets into a capsule forming pipe 3, where seamless capsules SC are produced.

In the case of the device shown in FIG. 1, a core liquid (inner-layer liquid) 4 of the capsules is stored in a core liquid tank 5. A pump 6 pushes the core liquid 4 into the nozzle 2. A coating liquid (outer-layer liquid) 7, which covers the core liquid 4, is stored in a coating liquid tank 8. A pump 9 pushes the coating liquid 7 into the nozzle 2. A tip portion of the nozzle 2 is inserted and disposed in the capsule forming pipe 3. The nozzle 2 releases the core liquid 4 and the coating liquid 7 in a two-layer state. The nozzle 2 is vibrated by a vibration exciter 11. The two-layer liquid released from the nozzle 2 into liquid coolant (hardening liquid) 12 is appropriately divided because of the vibrations given by the vibration exciter 11. In the capsule forming pipe 3, what is formed is a multilayer droplet 13 (abbreviated as droplet 13, hereinafter) in which the entire periphery of the core liquid 4 is covered with the coating liquid 7. The droplets 13 are cooled by the liquid coolant 12 in the capsule forming pipe 3 and become solid, forming spherical seamless capsules SC.

As shown in FIG. 1, the capsule forming pipe 3 is formed into a pipe having a curved-and-bent shape. The capsule forming pipe 3 includes an upstream portion 3A, which is substantially in the shape of J, and a downstream portion 3B, into which the upstream portion 3A is nested and which is in the shape of a reversed J. The upstream portion 3A fits into the downstream portion 3B and is fixed at a fitting portion 3C so as to be in a sealed state. A separator 14, which is substantially in the shape of a funnel, is placed under an outlet end of the downstream portion 3B. In the separator 14, a stretched mesh 15 is set so as to allow only the liquid coolant 12 to pass therethrough while not allowing the seamless capsules SC to pass therethrough.

After being separated from the seamless capsules SC in the separator 14, the liquid coolant 12 is collected into a separation tank 16 below. A pump 17 pushes the liquid coolant 12 in the separation tank 16 to a cooling tank 18. The liquid coolant 12 is cooled by a cooler 19 in the cooling tank 18 down to a predetermined temperature. The liquid coolant 12 in the cooling tank 18 is again supplied by a pump 21 to the capsule forming pipe 3. After the seamless capsules SC separated from the liquid coolant 12 in the separator 14 have reached an appropriate amount, the seamless capsules SC are collected in a products collection container (not shown) in a batch mode. Drying and other processes take place before the seamless capsules SC are turned into products.

As described above, the problem with the conventional seamless capsule manufacturing apparatus is that since the shape of the multilayer droplets changes due to disturbances in the flow of the liquid coolant, it is not possible to manufacture spherical capsules in a stable manner. According to the seamless capsule manufacturing apparatus 1 of the present invention, in order to manufacture spherical seamless capsules in a stable manner, various kinds of efforts have been made to have the stable flow of the liquid coolant 12. The following explains various kinds of techniques for stabilizing the flow of the liquid coolant, which have been employed for the seamless capsule manufacturing apparatus 1.

Figure 2:
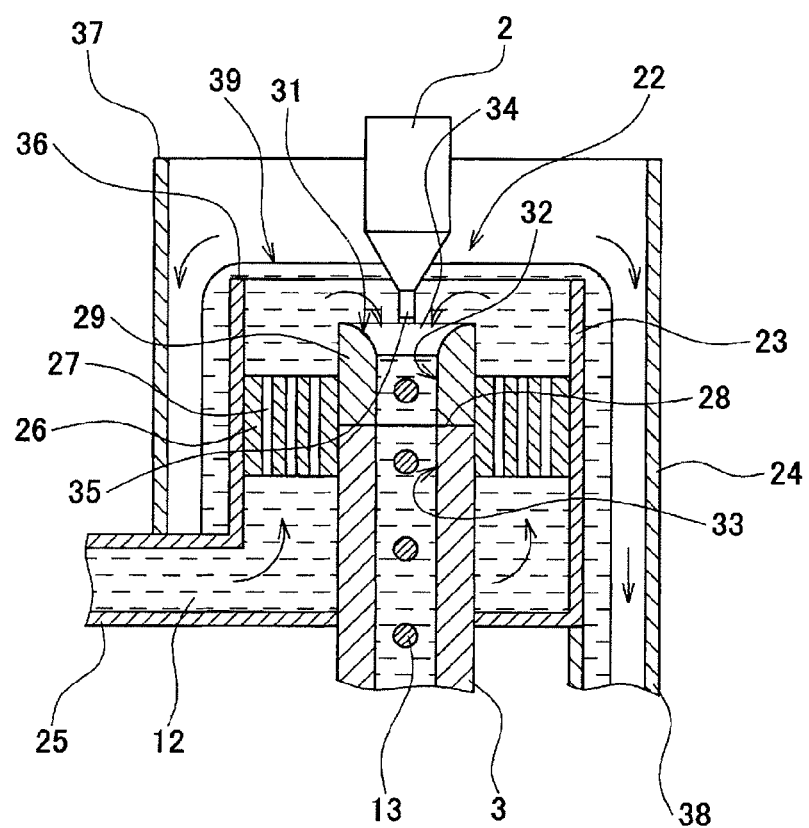
FIG. 2 is an explanatory diagram showing the configuration of a liquid coolant inflow section of the seamless capsule manufacturing apparatus shown in FIG. 1.
Figure 3:
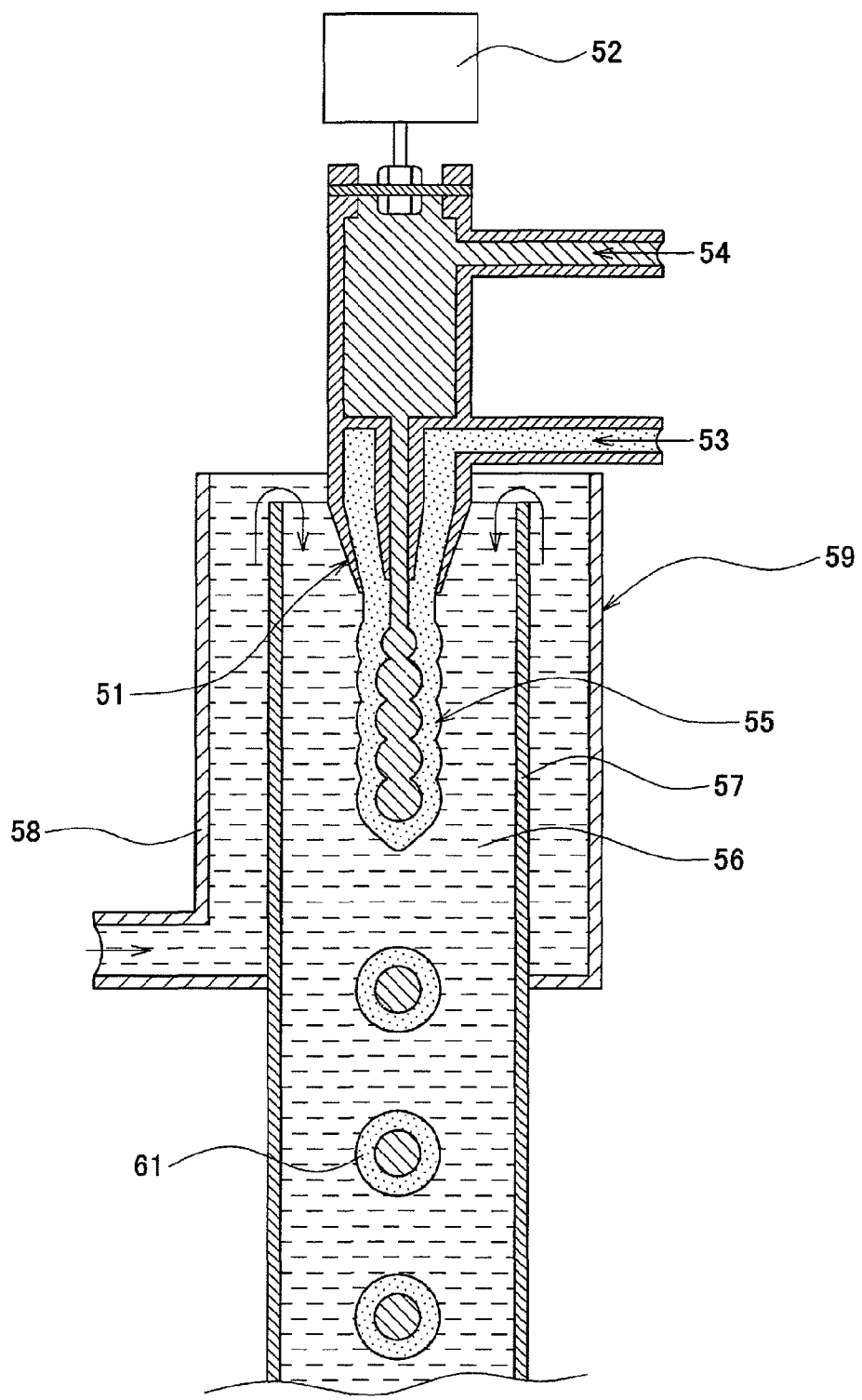
FIG. 3 is an explanatory diagram showing the configuration of a liquid coolant inflow section of a conventional seamless capsule manufacturing apparatus.

In the seamless capsule manufacturing apparatus 1, the liquid coolant 12 flows into the capsule forming pipe 3. A liquid coolant inflow section 22, in which a two-layer liquid is released from the nozzle 2, has a triple-pipe structure in which three cylindrical members are arranged concentrically. FIG. 2 is an explanatory diagram showing the configuration of the liquid coolant inflow section 22 provided close to an upper end portion of the capsule forming pipe 3. As shown in FIGS. 1 and 2, on the outer circumference of the upstream portion 3A of the capsule forming pipe 3, the following pipes are disposed concentrically: a liquid coolant supply pipe (hardening liquid supply pipe) 23, into which the liquid coolant 12 is supplied, and an overflow pipe 24, which discharges excess liquid coolant 12.

A pipe path 25 is attached to a bottom portion of the liquid coolant supply pipe 23; the pipe path 25 is connected to the pump 21. The pump 21 supplies the liquid coolant 12 in the cooling tank 18 into the liquid coolant supply pipe 23 via the pipe path 25. For the pump 21, a rotary pump having less pulsatory motion is used. Therefore, the liquid coolant 12 is supplied to the liquid coolant supply pipe 23 in such a way that the liquid flows in a stable manner with less pulsatory motion.

A flow straightening block 26 is put between the capsule forming pipe 3 and the liquid coolant supply pipe 23. What is formed in the flow straightening block 26 is a large number of flow straightening holes 27 that extend in an axial direction (which is the direction of a central axis of the liquid coolant supply pipe 23, or the vertical direction in the case of FIG. 2). The flow straightening holes 27 are formed in the shape of a straight pipe so as to run in the direction perpendicular to a cross-sectional surface of the capsule forming pipe 3 or liquid coolant supply pipe 23. The flow straightening holes 27 act to align the flow of the liquid coolant 12 with the axial direction to absorb pulsatory motion. If the flow straightening holes 27 are placed so as to lean with respect to the axial direction, a vortex flow emerges in the liquid coolant 12 at the downstream side of the flow straightening block 26, resulting in disturbances in the flow in the capsule forming pipe 3. Therefore, in order to even out the liquid coolant, it is preferred that the flow straightening holes 27 be linearly arranged in the axial direction. Thus, in the seamless capsule manufacturing apparatus 1, the flow straightening holes 27 are linearly arranged in the axial direction.

A cap 29 is attached to an upper end 28 of the capsule forming pipe 3. At an inner surface side of an upper end portion of the cap 29, a liquid coolant introducing section (hardening liquid introducing section) 31, which is in the shape of a curved surface, is formed. The inside diameter of the liquid coolant introducing section 31 is equal to the inside diameter of the capsule forming pipe 3. As illustrated in FIG. 2, the outside diameter of cap 2 is also equal to the outside diameter of the capsule forming pipe 3. An inner surface 32 of the cap 29 is seamlessly connected to an inner surface 33 of the capsule forming pipe 3 so that the cap 29 forms part of the capsule forming pipe 3. A tip portion 35 of the nozzle 2 is positioned above the center of the cap 29 so as to face an upper portion opening 34. As shown in FIG. 2, the nozzle tip portion 35 is submerged in the liquid coolant 12 during a capsule forming process. The nozzle tip portion 35 releases a two-layer liquid consisting of the core liquid 4 and the coating liquid 7 into the liquid coolant 12. The cap 29 can be replaced when necessary depending on the diameter of the capsule forming pipe 3.

In the liquid coolant inflow section 22, first the liquid coolant 12 is supplied to the bottom portion of the liquid coolant supply pipe 23. Since the liquid coolant 12 is supplied by the pump having less pulsatory motion, the amount of the liquid coolant 12 being supplied and the flow rate are stable when the liquid coolant 12 flows into the liquid coolant inflow section 22. After flowing into the liquid coolant supply pipe 23, the liquid coolant 12 goes up from the bottom portion to pass through the flow straightening block 26. As the liquid coolant 12 passes through the flow straightening block, the flow of the liquid coolant 12 is straightened and the pulsatory motion is suppressed further. After the flow is straightened by the flow straightening block 26, the liquid coolant 12 flows into the cap from the upper portion opening 34 of the cap 29. An upper end 36 of the liquid coolant supply pipe 23 is set higher than an upper end of the cap 29. Therefore, the liquid coolant 12 in the liquid coolant supply pipe 23 overflows into the cap 29 as the level of the liquid coolant 12 rises.

The liquid coolant 12 has been straightened by the flow straightening block 26. Therefore, the liquid coolant 12 flows into the cap 29 without causing disturbances such as vortexes. Additionally, since what is provided at the inner surface side of the upper end portion of the cap 29 is the liquid coolant introducing section 31 that is in the shape of a curved surface, the liquid coolant 12, when flowing into the cap 29, flows into the cap 29 smoothly. Since the inside diameter of the cap 29 is equal to the inside diameter of the capsule forming pipe 3, the joint does not disturb the flow of the liquid coolant 12. Thus, the flow of the liquid coolant 12 into the capsule forming pipe 3 is stable and uniform. The speed of the two-layer liquid, which is dropped into the liquid coolant 12 to form capsules, as well as the speed of the droplets 13, does not change abruptly. Therefore, it is possible to prevent the deformation of the capsules caused by a sudden change in the speed of the flow of the two-layer liquid or droplets 13.

On the outside of the liquid coolant inflow section 22, the overflow pipe 24 is provided. An upper end 37 of the overflow pipe 24 is set higher than an upper end 36 of the liquid coolant supply pipe 23. That is, the upper end 36 of the liquid coolant supply pipe 23 is placed higher than the upper end of the cap 29 but lower than the upper end 37 of the overflow pipe 24. Therefore, the liquid coolant 12 in the liquid coolant supply pipe 23 first flows into the capsule forming pipe 3 through the cap 29. However, when excess liquid coolant 12 emerges, the excess liquid coolant 12 is discharged from the overflow pipe 24 when necessary. That is, the liquid coolant supply pipe 23 has the capsule forming pipe 3 as a first overflow section inside thereof, and the liquid coolant supply pipe 23 itself acts as a dam, forming a second overflow section outside thereof.

As for the configuration shown in FIG. 2, if there is no overflow pipe 24, the flow volume needs to be controlled very accurately in order for the surface of the liquid coolant to be kept at a constant level in the capsule forming pipe 3. Even when the overflow takes place in the overflow pipe 24 in order to stabilize the surface of the liquid coolant, the flow converges on a portion of the pipe if the liquid coolant overflows into the portion. If the overflow becomes unbalanced, the flow of the liquid coolant 12 into the capsule forming pipe 3 also becomes unbalanced. Accordingly, in the seamless capsule manufacturing apparatus 1, the overflow pipe 24 is provided so as to surround the entire periphery of the liquid coolant inflow section 22. Moreover, the liquid coolant 12 is allowed to evenly spill over the entire circumference of the upper end 36 of the liquid coolant supply pipe 23. Therefore, the flow of the liquid coolant 12 into the capsule forming pipe 3 does not become unbalanced. Incidentally, to allow the liquid coolant 12 to evenly spill over, the liquid coolant supply pipe 23 is formed so as to be uniform in height (i.e., the upper end 36 thereof is disposed horizontally). After flowing into the overflow pipe 24, the liquid coolant 12 returns into the cooling tank 18 via a return pipe 38.

In that manner, according to the seamless capsule manufacturing apparatus 1 of the present invention, (1) the liquid coolant 12 is supplied with the use of a pump of a low pulsatory motion type having less pulsatory motion; and (2) the pulsatory motion of the liquid coolant 12 is further curbed by the flow straightening block 26. Therefore, the liquid coolant 12 is supplied in a stable manner. Moreover, (3) the liquid coolant (hardening liquid) introducing section 31 is formed into a curved surface. Therefore, the liquid coolant 12 flows into the capsule forming pipe 3 smoothly. Furthermore, (4) the liquid coolant 12 is allowed to overflow into the capsule forming pipe 3, and the overflow pipe 24 is also provided outside the liquid coolant supply pipe 23. Therefore, excess liquid coolant spills over the entire circumference of the liquid coolant supply pipe 23, allowing the liquid coolant 12 to evenly flow into the capsule forming pipe 3.

Thanks to the above measures (1) to (4), in the seamless capsule manufacturing apparatus 1, the liquid surface 39 formed by the liquid coolant 12 does not ripple and remains very calm and smooth. Therefore, it is possible to keep the center of the liquid surface 39 from going down and prevent other disturbances in the flow of the liquid coolant. Thus, it is possible to prevent the deformation of the capsules caused by disturbances, such as vortexes formed in the capsule forming pipe 3, or by changes in the velocity of the flow of the liquid coolant 12. Therefore, the spherical capsules can be manufactured in a stable manner. The liquid coolant 12 also spills over into the overflow pipe 24 when necessary. Therefore, it is possible to stabilize the position of the liquid surface 39 without accurately controlling the amount of the liquid coolant 12 being supplied. As a result, it is possible to ensure that the tip portion 35 of the nozzle 2 will reach the liquid surface 39 and to prevent other troubles. In that respect, the stable production of the capsules is achieved. In that respect, the stable production of the capsules is achieved.

The present invention is not limited to the above-described embodiment. Needless to say, various modifications may be made without departing from the scope of the invention.

For example, what is described of the above embodiment is an example in which a rotary pump is used for the pump 21. However, the type of the pump is not limited to the above. As long as the pump is of a low pulsatory motion type, a positive displacement pump, such as Mono pump, or the like is also available, for example. Moreover, a flexible hose, such as a pleated hose, may be used for the pipe path 25 in order to prevent pulsatory motion. A pressure regulator may be placed in the pipe path 25 to absorb pulsatory motion.

The invention claimed is:

1. A capsule manufacturing apparatus that releases a droplet from a nozzle into a capsule forming pipe through which a hardening liquid flows so as to cause a surface portion of the droplet to solidify in the hardening liquid to produce a seamless capsule, said apparatus comprising:
   a hardening liquid supply pipe configured to surround an outside surface of the capsule forming pipe, an upper end of said hardening liquid supply pipe being set higher than an upper end of the capsule forming pipe so that the hardening liquid supplied from a bottom portion of said hardening liquid supply pipe flows into the capsule forming pipe having an opening at a central portion of said hardening liquid supply pipe;
   a removable cap member to be mounted on an upper end of the capsule forming pipe, said cap member being replaceable so as to conform to a diameter of the capsule forming pipe, said cap member having a hardening liquid introduction section shaped as a curved surface at an inner surface side of an upper end of said cap member;
   an overflow pipe configured to surround an outside of said hardening liquid supply pipe, an upper end of said overflow pipe being set higher than said upper end of said hardening liquid supply pipe so that the hardening liquid in said hardening liquid supply pipe spills over said upper end of said hardening liquid supply pipe into said overflow pipe so as to stabilize a liquid surface of the hardening liquid; and
   a low-pulsatory-motion rotary pump for supplying the hardening liquid into said hardening liquid supply pipe.

2. The capsule manufacturing apparatus according to claim 1, wherein said hardening liquid supply pipe includes a flow straightening block including a plurality of flow straightening holes, each of said flow straightening holes extending in an axial direction so that the hardening liquid flowing up from a bottom portion of said hardening liquid supply pipe passes through said flow straightening holes.

3. The capsule manufacturing apparatus according to claim 1, wherein an inside diameter of said cap member is equal to an inside diameter of the capsule forming pipe so that a joint formed between said cap member and the capsule forming pipe does not disturb a flow of the hardening liquid.

4. The capsule manufacturing apparatus according to claim 3, wherein an outside diameter of said cap member is equal to an outside diameter of the capsule forming pipe.

5. The capsule manufacturing apparatus according to claim 1, further comprising a pipe path for supplying the hardening liquid to said hardening liquid supply pipe, said pipe path comprising a flexible hose to prevent pulsatory motion.

* * * * *